3,241,116
CONTROLLER FOR TRANSFERRING A PROGRAM FROM TRANSMITTER TO RECEIVER
Philip Cane, Brooklyn, N.Y., assignor to The Marbelite Company, Inc., Brooklyn, N.Y., a corporation of New York
Filed Jan. 16, 1961, Ser. No. 83,061
6 Claims. (Cl. 340—147)

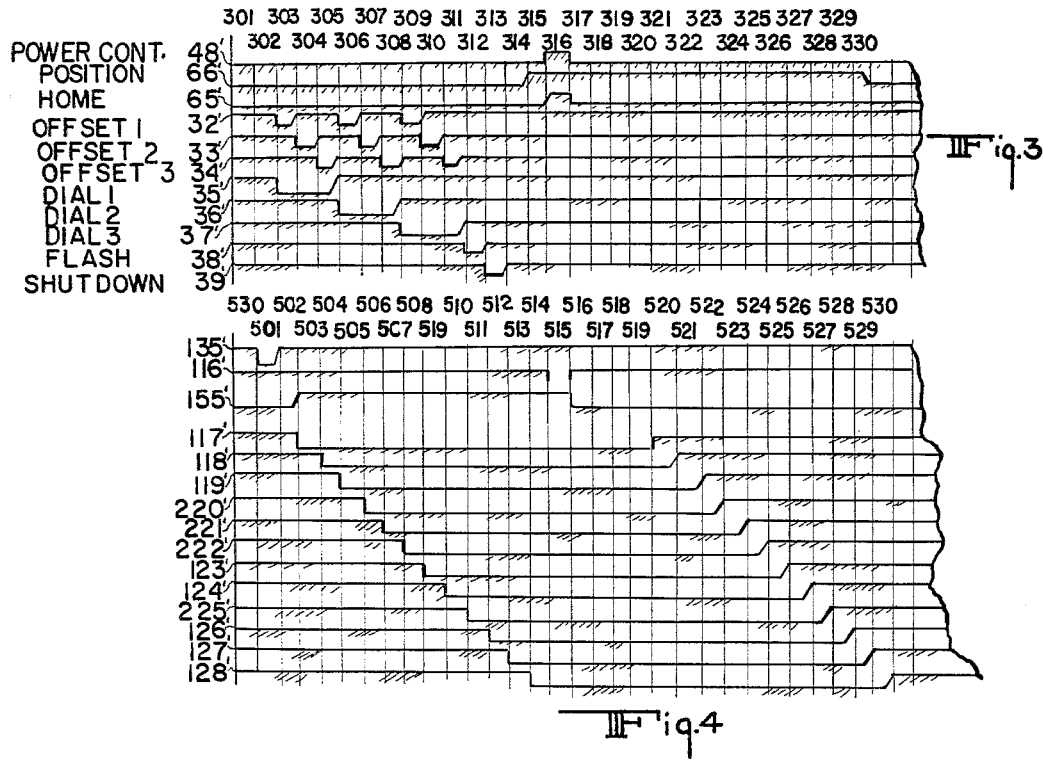
Fig. 3
Fig. 4
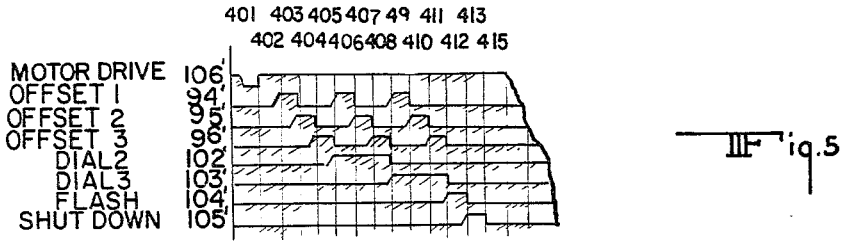
Fig. 5
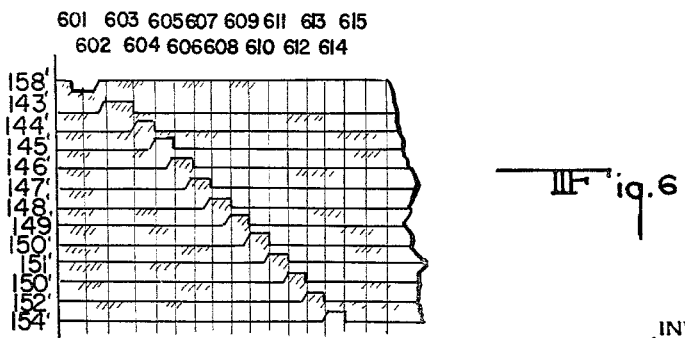
Fig. 6
INVENTOR
Philip Cane
BY
Robertson & Smythe
ATTORNEYS United States Patent Office 3,241,116
Patented Mar. 15, 1966

The present invention relates to a remote control system and particularly to a system adapted to the control of secondary traffic controllers by a master traffic controller.

In remote control systems such as a system in which a master traffic controller is used to select one or several control devices of a plurality of devices in a secondary controller, a plurality of circuits have been employed to connect the master controller to the secondary controller. Where the plurality of devices in the secondary controller is of an appreciable magnitude, it is obvious that a great number of circuits must be provided in order to permit a selection of one of or several of these devices. It is obvious also that in a system in which a single master controller is to transmit a control program to a great number of secondary controllers which may be spaced at great distances from one another, the problem of providing the required number of connecting circuits becomes a great one.

An important object of this invention is to provide a system in which a master controller or transmitter may be connected by a single circuit in order to control a secondary controller or receiver.

Another object of this invention is to provide a remote control system in which a program of operation may be selected at a master controller connected by a single circuit to a secondary controller so as to establish the program in the secondary controller.

Still another object of the invention is to provide a remote control system in which a master controller connected to a single output circuit may control a plurality of secondary controllers connected in parallel to said single output circuit.

In one aspect of the invention, the remote control system includes a transmitter having an output means. The transmitter includes means for providing a plurality of control signals each being identifiable from the other. In addition the transmitter includes a plurality of transmitter switch means which upon being in an activated condition can connect control signals to the transmitter output means. Means are also included for operating a transmitter switch means to an activated condition within the operating cycle of the transmitter. Each of the transmitter switch means corresponds to a device to be controlled by a remote signal system. The system in addition includes a receiver having its input means connected to the transmitter output means. The receiver has a plurality of receiver switch means for energizing the device to be controlled by the remote control system. Means are provided for operating the plurality of receiver switch means to their activated conditions within the operating cycle of the receiver. Means are also provided responsive to the transmitted control signals for actuating the operaing means to operate the receiver switch means. The receiver switch means are operated through a reference location to a location within the receiver operating cycle at which point the devices corresponding to the transmitter switch means are energized.

In another aspect of the invention, a remote control system is provided with means for selecting the transmitter switches of the plurality of transmitter switches to be activated during the transmitter operating cycle.

In still another aspect of the invention, additional switch means are provided in the transmitter which are responsive to the activated transmitter switch means to control the operating means to drive the plurality of transmitter switch means through the initial portion of the transmitter operating cycle to a location in the remaining portion of the transmitter operating cycle wherein the transmitter switch means are activated. At the same time the transmitter is provided with other additional transmitter switch means which are sequentially responsive to the transmitter switch means to connect different control signals to the transmitter output. The receiver likewise includes additional switch means responsive to the transmitted control signal to control the operating means in order to operate the receiver switch means to a reference location in the receiver operating cycle to establish a predetermined relationship with the operating cycle of the transmitter. The receiver also includes additional receiver switch means responsive to different transmitted control signals to control the receiver operating means to drive the receiver switch means to a location in the receiver operating cycle wherein the devices corresponding to the transmitter switch means are energized by the activated receiver switch means.

The above as well as other objects, novel features, and advantages will become apparent from the following specification and accompanying drawings which are merely exemplary.

In the drawings:

FIG. 3 is a graphical representation of the transmitter cam switch.

FIG. 4 is a graphical representation of the receiver cam switch.

FIG. 5 is a graphical representation of the auxiliary transmitter cam switch.

FIG. 6 is a graphical representation of the auxiliary receiver cam switch.

Figure 1:
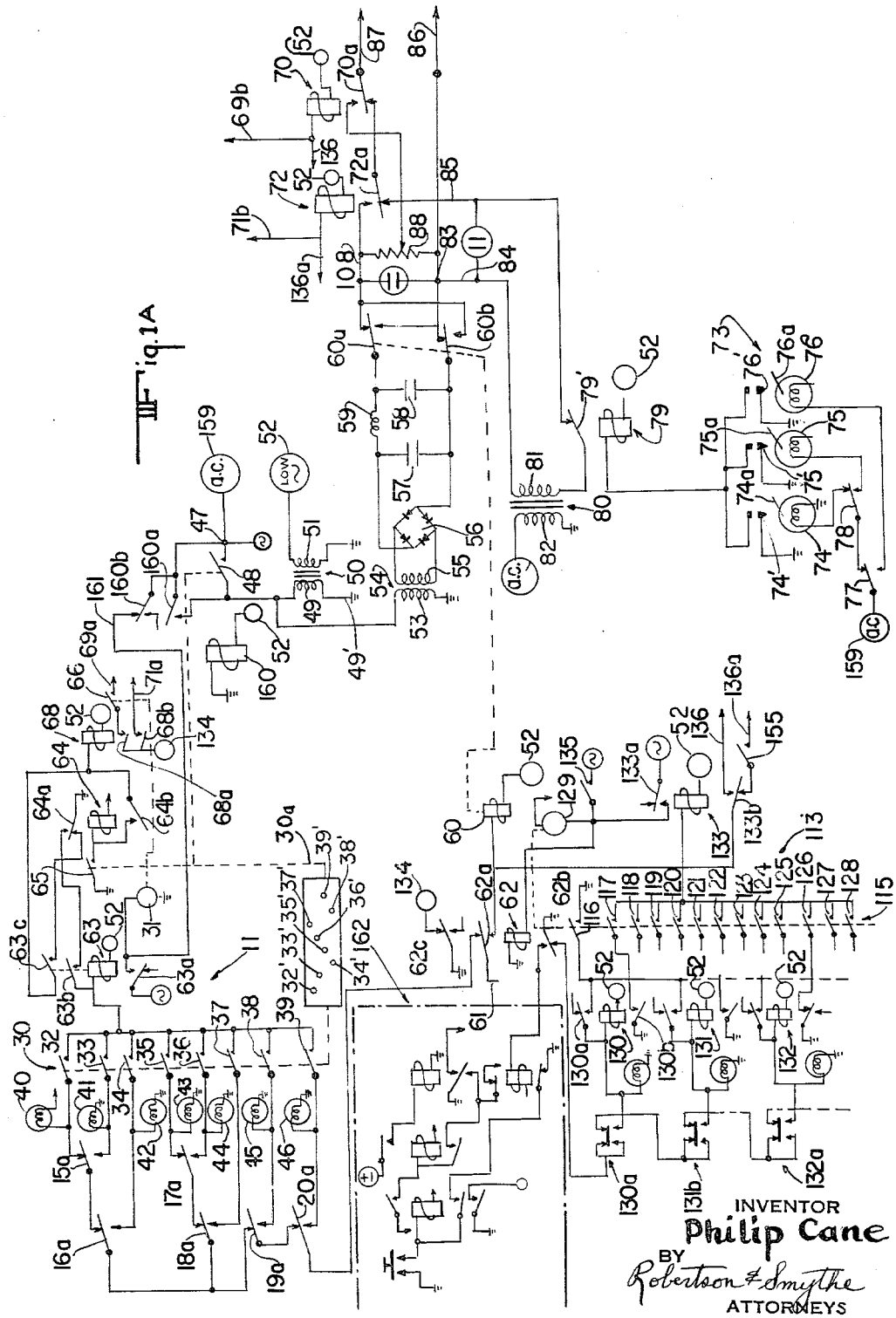
FIG. 1A is a schematic representation of the system transmitter and auxiliary transmitter.
FIG. 1B is a schematic representation of the system receiver and the auxiliary receiver.

In one embodiment, the invention may be used as a master traffic controller to control secondary signal controllers which are located at a distance from it. As is customary in the traffic controller art, the traffic controller may contain a dial unit which includes a synchronous motor driving a plurality of switches and a cam means controlling the switches in a predetermined manner. The dial unit in turn may control a switching unit which may include a plurality of cam operated switches. These switches are used directly to control the traffic signals.

The dial unit is driven by a synchronous motor so that its speed may be maintained at a known function of time by the frequency of the A.C. power supplied to the equipment. The duration of the cycle of operation of the dial unit is determined by the selection of the gearing which drives the dial. Keys on the dial are positioned so as to actuate switches at predetermined intervals within the cycle. In many instances, the secondary traffic controller is provided with a plurality of dial units, each being set for a particular traffic condition. In a traffic control system, a master controller is used to select the dial unit of the remote traffic controllers which has been previously set for a particular traffic condition.

In a traffic control system for a road having a plurality of interesections with other roads, the various secondary controllers must be related to operate in a predetermined relationship with one another. By operating the synchronous motor of each controller from a common A.C. power supply, the speeds of the various motors may be maintained at a predetermined constant value. Similarly, the gearing of the dial units may be selected to maintain a constant cycle time of one of the various predetermined durations. In a system employing a plurality of remote controllers, a master controller is often employed to operate the secondary controllers in succession with a predetermined period between operations. This relationship between the secondary controllers is known as the offset and it may be generally defined as the relative time the green light first appears in each succeeding intersection in the control system. In the art it is common to provide means for selecting a particular offset from the master controller. In order to accomplish the same, the dial unit is provided with a plurality of offset switches which are operated by dial keys. The dial keys are set with respect to the dial so as to provide various selectable offset relationships of the particular dial unit with respect to the master controller. Thus, by selecting the particular offset switch at the dial unit, it is possible to select a particular relationship of the operating effect of the dial with respect to the dial of the master controller.

The control system of this invention enables the master controller to transmit signals to a secondary controller over a single circuit with the result that the secondary controller may be selected to operate in modes such as "offset 1," "offset 2," or "offset 3" with "dial 1," "dial 2," "dial 3" or in the "flash" or "shutdown" conditions. Since the control system simply requires a single circuit between the master and a secondary controller, it is obvious that where wires are used to connect the controllers, a single pair of wires may perform this function.

Figure 2:
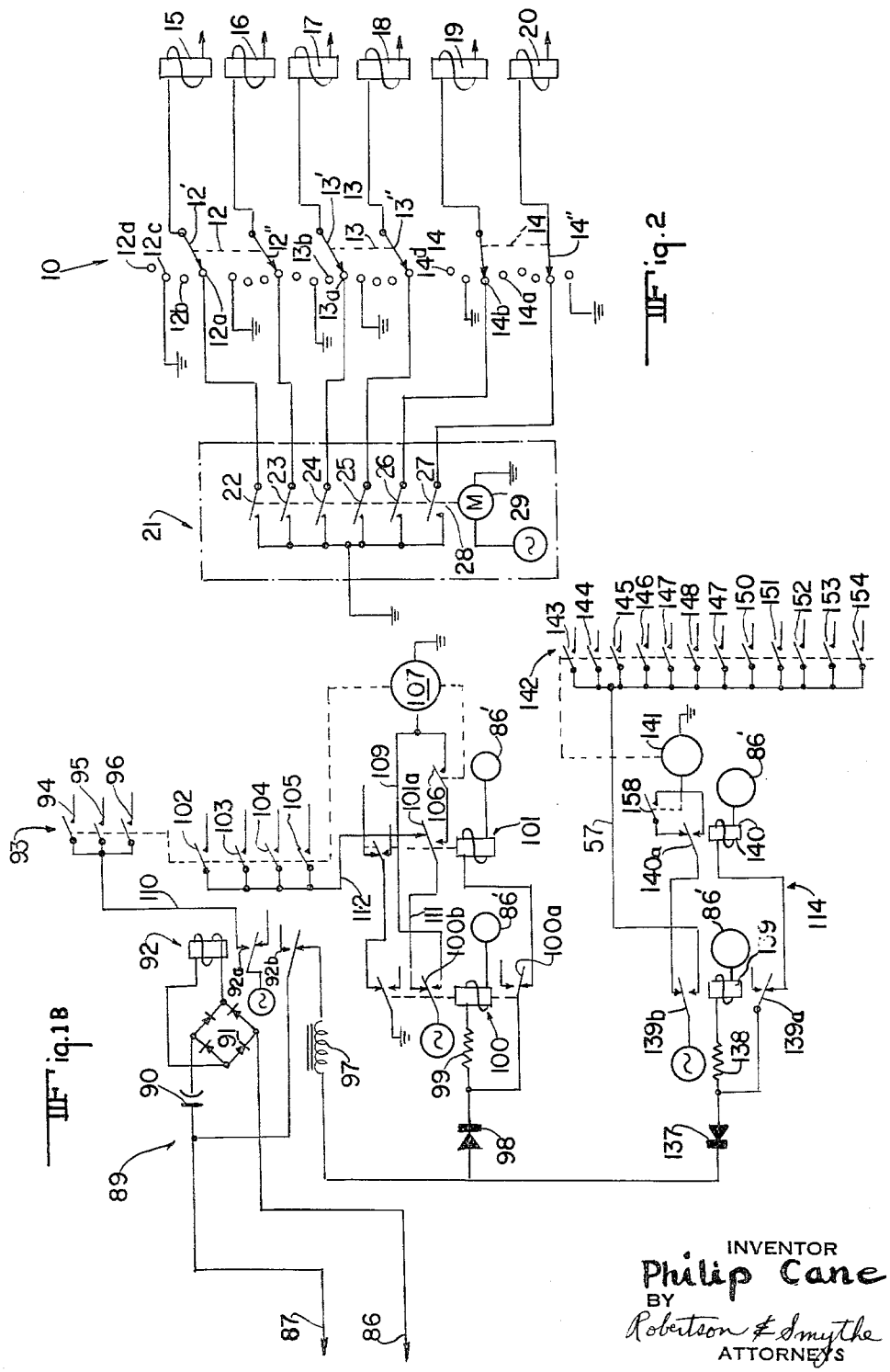
FIG. 2 is a schematic representation of the program selector and system selector switches.

The program which the master controller is to require of the secondary controllers connected to it is determined by the setting of program selector 10 (FIG. 2) in system transmitter 11. In the embodiment shown, the system transmitter is capable of selecting any one of three offset conditions, any one of three dial units, a "flash" condition, or a "shutdown" condition. Program selector 10 includes selector switches 12, 13 and 14. Selector switch 12 includes switch arms 12' and 12" which may be positioned with respect to contacts 12a to 12d. Switch arms 12' and 12" are connected to "offset 2" relay 15 and to "offset 3" relay 16, respectively. Selector switch 13 includes switch arms 13' and 13" which may be operated through positions 13a to 13d. Switch arms 13' and 13" are connected to "dial 2" relay 17 and "dial 3" relay 18, respectively. Selector switch 14 includes switch arms 14' and 14" which may be moved through positions 14a to 14d. Switch arms 14' and 14" are connected to "flash" relay 19 and a "shutdown" relay 20, respectively.

Program selector 10 may include program timer 21 having switches 22–27, inclusive, which are actuated by cam 28 driven by motor 29. The contacts of relays 15–20, inclusive, are in circuits related to the contacts of cam switch 30 (FIG. 1A) which is driven by motor 31. Switches 32–39, inclusive, of cam switch 30 are driven in a predetermined sequence by the lobes 32' to 39' of cam 30a. Program timer 21 (FIG. 2) may be employed to provide various offset and dial conditions for a given period of time such as a complete day.

In order to place the program timer in command it is necessary to set switches 12 and 13 in the a position and switch 14 in the b position. In this manner, it is evident that switches 22–27, inclusive, are placed in circuit with relays 15–20 inclusive. Here it should be noted that the de-energized conditions of the "offset 2" and the "offset 3," relays 15 and 16, respectively, corresponds to the "offset 1" condition. Similarly, the deenergized condition of "dial 2" relay and "dial 3," relays 17 and 18, respectively corresponds to the "dial 1" position.

For manual control, switches 12 and 13 may be set to position b which corresponds to an "offset 1, dial 1" condition. Position c of switch 12 corresponds to the "offset 2" condition while position d of switch 12 selects the "offset 3" condition. Position c of switch 13 selects the "dial 2" condition while position d selects the "dial 3" condition. With respect to switch 14, position a selects the "shutdown" mode, position b corresponds to a "program" mode, and position c selects the "flash" mode.

As shown in FIG. 1A, relay contacts 15a and 16a can complete a circuit to switches 32, 33 and 34 which correspond to "offsets 1," "2" and "3," respectively. Relay contacts 17a and 18a can complete a circuit to switches 35, 36 and 37 which correspond to "dial 1," "2" and "3" respectively. Relay contact 19a normally connects to relay contacts 16a and 18a. When relay contact 19a is actuated, it completes a circuit through switch 38 which is the "flash" condition. Relay contact 20a in the energized position completes a circuit to switch 39 which corresponds to the "shutdown" condition. In order to show the program which has been selected, indicating lamps 40–45, inclusive, are connected to switches 32–39 respectively, adjacent to the sides of the switches which lead to the contacts of relays 15–20, inclusive.

The input alternating current source 159 to the system transmitter is connected to terminal 47. Terminal 47 is connected through switch 48 of cam switch 30 to primary winding 49 of transformer 50. Primary winding 49 may be grounded at 49' to the chassis of the system transmitter. Secondary winding 51 of transformer 50 provides a low voltage alternating current at terminal 52. Alternating current power is also connected to primary winding 53 of step-down transformer 54, the secondary winding 55 of which supplies current to full-wave rectifier 56. Rectifier 56 is connected to a filter circuit including capacitors 57 and 58 and choke 59 so that filtered D.C. may be furnished to switch arms 60a and 60b which are operated by relay 60.

Reviewing the operation of the transmitter, it may be assumed, for example, that switches 22 and 24 are closed so as to actuate "offset 2" relay 15 and "dial 2" relay 17, respectively. The actuation of "offset 2" relay 15 connects switch arm 15a to switch 33 of cam switch 30. In this way, ground connection 61 is connected through switch arm 62a of "lockout" relay 62, switch arm 20a, switch arm 19a and switch arm 16a to switch arm 15a. The actuation of "dial 2" relay 17 causes switch arm 17a to complete a circuit to switch 36 of cam switch 30. Switch arm 17a is connected to ground connection 61 by means of switch arms 18a, 19a, 20a, and 62a.

As indicated in FIG. 1A, when switch arms 15a and 17a are actuated by their respective relays, a ground connection is completed to switches 33 and 36 which are normally closed until actuated by cam 30a driven by motor 31. The circuit formed through a closed switch actuates relay 63. The actuation of relay 63 energizes motor 31 through contact 63a. At the same time, the actuation of relay 63 completes a holding circuit for the relay through contact 63b and contact 64a of relay 64. With motor 31 energized, cam switch 30 is rotated so that cams 32'–39', as well as 48', 65' and 66', actuate their respective switches through positions 301–330 as shown in FIG. 3. Motor 31 then drives cam switch 30 until position 316 is reached, at which point cam 65' actuates switch 65 to energize relay 64, thereby closing contacts 64a and 64b. Relay 64 then completes a holding circuit through contact 64b, contact 63c, and contact 64a to ground.

At position 316 of cam switch 30, the closing of switch 65 actuates relay 64 and opens the holding circuit of relay 63 by opening contact 64a. Relay 63 remains energized by means of switches 33 and 36 of cam switch 30. Upon the closing of switch 65, the actuation of relay 64 is accompanied by the actuation of relay 68. The actuation of relay 68 provides a ground connection through closed switch 66 and line 69a to line 69b connected to relay 70. Similarly, contact 68b provides a ground connection through line 71a which connects 71b to line which leads to relay 72.

As shown in FIG. 1A, the transmitter includes master dial selector 73 which includes dial units 74, 75 and 76, By operation of selector switches 77 and 78, any one of the three dial units may be connected to their respective contacts 74', 75' and 76'. The dial units include synchronous motors driven by A.C. supply 159 connected to selector switch 77. The synchronous motors actuate the switches by means of their respective keys 74a, 75a and 76a. Master dial selector 73 controls master relay 79 which in its energized state opens the circuit through secondary winding 81 of transformer 80. In its de-energized condition, relay 79 provides alternating current from primary winding 82 of transformer 80 to terminal 83 of line 84 and to line 85. With relays 70 and 72 de-energized, A.C. from secondary winding 81 is connected through terminal 83 to output terminal 86 and also through contacts 72a and 70a to output terminal 87. Output terminals 86 and 87 feed a single circuit which connects the transmitter to the receiver of the control system.

Upon the actuation of relay 68 and a subsequent actuation of relay 70, low level D.C. furnished by a potentiometer 88 is connected through contact 70a to output terminal 87. At the same time, terminal 83 completes the other side of the circuit to output terminal 86. The single connecting circuit from output terminals 86 and 87 of the system transmitter is connected to input terminals 86' and 87' of system receiver 89 (FIG. 1B). Prior to energizing relays 70 and 72, A.C. from secondary winding 81 is applied to terminals 86' and 87' and then through blocking condenser 90 to full-wave rectifier 91. The output of rectifier 91 actuates relay 92 which applies local A.C. power through contact 92a to switches 94, 95 and 96 of cam switch 93. Switches 94, 95 and 96 correspond to "offset 1," "offset 2" and "offset 3" positions for the system receiver. The application of A.C. to input terminals 86' and 87' is blocked from passing through contact 92b by means of choke 97 until relay 92 has sufficient time to operate and disconnect choke 97 from the circuit.

Upon the actuation of relay 70, the A.C. from secondary winding 81 is cut off from output terminals 86 and 87 and in its place low voltage D.C. is applied through contact 70a and terminal 83 to output terminals 87 and 86 respectively. The removal of the A.C. de-energizes relay 92. The low voltage D.C. which is blocked from passing to rectifier 91 by means of condenser 90 is connected through contact 92b and choke 97 to diode 98. The high impedance of series resistor 99 isolates relay 100 from the low voltage D.C. which in turn passes through contact 100a to relay 101. In addition to switches 94, 95 and 96, cam switch 93 includes switches 102–106 inclusive. Cam switch 93, as indicated in FIG. 5, operates through positions 401–415 inclusive. Upon the actuation of relay 101, a circuit is completed through contact 100b, 101a and switch 106 to motor 107 which operates cam switch 93. Once started, motor 107 continues to operate until switch 106 is opened at position 402 of cam 106'.

As previously described, with relay 68 energized and switch 66 closed, both relays 70 and 72 become energized, whereupon contact 70a connects low voltage D.C. potentiometer 88 to output terminal 87, which is ultimately fed to the system receiver. As indicated in FIG. 3, the low voltage D.C. remains connected to output terminal 87 until cam 66' arrives at position 301 at which time relay 70 is de-energized. The result is that contact 70a, in circuit with contact 72a and terminal 108 of potentiometer 88, then cause high voltage D.C. to be furnished to output terminal 87.

The high level positive D.C. voltage delivered to the receiver at input 87' is sufficient to cause diode 98 to conduct and also to overcome the high impedance of resistor 99 so as to energize relay 100. The actuation of relay 100 serves to disconnect contact 100a from relay 10 so that motor 107 would become de-energized except that at the same time a circuit is completed to contact 100b and line 109 to motor 107. In this manner, motor 107 will continue to run so long as relay 100 is energized.

Since the movement of cam switch 30 to position 301 opens switch 66 which de-energizes relay 70, the timing of receiver motor 107 is begun since the de-energizing of relay 70 connects the high voltage D.C. through contact 72a and 70a to output terminal 87 and then to relay 100 to actuate receiver motor 107. Thus the driving of the receiver motor into its ultimate position is determined by the length of time that relay 72 remains energized after cam switch 30 passes through position 301. From that point on, the shafts of cam switches 30 and 93 are driven in synchronism by their respective motors.

As the cam shaft of cam switch 30 passes through positions 301, 302 and 303, switches 33 and 36 remain closed and thus keep relay 63 energized. This condition is shown by the cam chart of FIG. 3. At position 304, switch 33 is opened but switch 36 remains closed, thereby maintaining the actuation of relay 63a. At position 306, switch 33 is closed while switch 36 is opened. It is not until position 307 is reached that both switches 33 and 36 are simultaneously opened, thereby de-energizing relay 63. The dropping out of relay 63 opens contact 63a which stops motor 31 and opens contact 63c which causes the ground circuit of both relays 64 and 68 to be opened. The dropping out of relay 68 results in the dropping out of relays 70 and 72 so that only the A.C. voltage of secondary winding 81 is transmitted through output terminals 86 and 87 to the system receiver. The removal of the D.C. voltage from the receiver causes relay 100 to drop out and to open a circuit through contact 100b to motor 107. Thus the simultaneous dropping out of relays 63 and 100 causes motors 31 and 107 respectively to stop.

When the cam switch 30 stopped at position 307, cam switch 93 which had been travelling in synchronism with it stops at position 407 as shown on the cam chart of FIG. 5. At position 407 it may be noted that cam 95' and 102', only close their respective switches 95 and 102 which correspond to "offset 2" and "dial 2" positions. It is therefore evident that in this manner the receiver has been operated until cam switch 93 has been driven until the receiver switches which correspond to the selection on the program selector have been closed. In this condition, A.C. power is provided by means of contact 92a and line 110 to switches 94, 95 and 96. Similarly, A.C. power is supplied through contact 100b, line 111, and contact 101a to line 112 which leads to switches 102–105, inclusive.

Auxiliary transmitter 113 and auxiliary receiver 114 may be used in conjunction with the system transmitter and receiver. Auxiliary transmitter 113 includes cam switch 115 having switches 116–128, inclusive. The switches are driven by means of cams 117'–128', inclusive, which are actuated by motor 129. A signal or operation may be set up in the auxiliary transmitter by means of pushbuttons 130A, 131A, 132A, etc., which are connected to relays 130, 131 and 132 respectively. For an example, upon pushing switch 130A, relay 130 is energized by a circuit leading through contact 130a and contact 62b to ground. The actuation of relay 130 completes a circuit through contact 130a and contact 116 to ground. At the same time the closing of contact 130b completes a ground connection to switch 117. As shown in the cam chart of FIG. 4, switch 116 is normally closed except for position 515. The circuit through switch 117 energizes relay 133, thereby completing the circuit to motor 129 through contact 133a.

At the same time, a circuit is completed through contact 133a to the winding of relay 62 which serves as a lockout relay in as much as whenever a signal is being transmitted by the system transmitter, the auxiliary transmitter will be given precedence and relay 62 will discontinue the transmission of signals by the system transmitter. The discontinuance of the system transmitter is effected by the opening of contact 62a which grounds the system transmitter through terminal 61. At the same time terminal 134 is removed from its ground connection through contact 62c. The actuation of relay 62 closes contact 62a and thereby energizes relay 60, the reversing relay. The function of reversing relay 60 is to switch contacts 60a and 60b so that the positive side of the D.C. supply for rectifier 56 is ultimately connected to output terminal 86 instead of output terminal 87.

Once cam switch 115 has been set into motion and is being driven by motor 129, switch 135 operated by cam 135' of cam switch 115 is closed and maintains a circuit to motor 129. The cam chart of FIG. 4 indicates that cam 135' closes its related switch for all positions except position 501. Consequently, once cam switch 115 is out of position 501, motor 129 will continue to drive until it gets back to position 501. This means that the auxiliary transmitter always starts in position 501 as opposed to the system transmitter which always starts from whatever position it was left in last, then goes back to the home or number 301 position, and then advances to the new selected position.

The actuation of relay 62 provides a ground connection to contact 133b, actuated relay 133, and lead 136 which connects to line 69b connected to relay 70. The actuation of relay 70 causes a low D.C. voltage of negative polarity to be applied to terminal 87. The negative polarity is a consequence of the prior operation of reversing relay 60. The actuation of relay 70 also disconnects the A.C. source of secondary winding 81 from output terminals 86 and 87.

At auxiliary receiver 114, the low level negative D.C. voltage is applied to input terminal 87' which is connected through contact 92b and choke 97 to diode 137 which conducts in the presence of the negative voltage. Diode 98 at the same time blocks the negative voltage. The high value of resistor 138 serves to block the low level D.C. signal from relay 39. The low level D.C. signal passes through contact 139a and then through relay 140, which positions contact 140a to energize motor 141. Motor 141 drives the shaft of cam switch 142 which includes switches 143–154, inclusive. Motor 141 continues to operate as long as relay 133 is energized and maintains contact 133b connected to line 136. For the case discussed above where switch 130a has been set, motor 129 will drive the cam shaft of cam switch 115 with switch 117 being closed for positions 501 and 502 as indicated in FIG. 4. Upon reaching position 503, switch 117 opens, thereby deenergizing relay 133. Contact 133b of relay 133 is then disconnected from line 136 with the result that relay 70 is deenergized. The dropping out of relay 70 removes the low level D.C. transmitted to the system receiver. During this time relay 62 remains energized as well as motor 129 by means of switch 135. Beyond position 503 of the cam shaft, cam 155' closes cam switch 155 which is connected to line 156, leading to relay 72. The actuation of relay 72 results in the connecting of the high level negative D.C. voltage through contact 72a and contact 70a to output terminal 87.

The high level of negative D.C. voltage passes through diode 137 and resistor 138 to energize relay 139. The actuation of relay 139 deenergizes relay 140 thereby cutting off motor 141. At the same time contact 139b connects the A.C. power to line 157 which is connected to one side of switches 143–154, inclusive, of cam switch 142. In this manner the cam shaft of cam switch 142 will be advanced to position 603 corresponding to position 503 of the auxiliary transmitter. The cam chart of the auxiliary receiver shown in FIG. 6, indicates that at position 603, contact 143 is closed. Switches 143–154, inclusive, may be connected to latch or memory type relays which are connected to the devices to be controlled by the remote control system.

Relay 139 still remains energized as long as cam 135' of the auxiliary transmitter is closed. When cam 135' reaches the home position, position 501, switch 135 is opened which in turn deenergizes relay 62 and motor 29.

As indicated in FIG. 4, at position 517, switch 155 is opened with the result that relay 72 is deenergized. The dropping out of relay 72 removes the high negative D.C. voltage from output terminal 87.

In the absence of the high level negative D.C. voltage at relay 139, relay 139 drops out, thereby completing a circuit through contact 139b, 140a and switch 158 to motor 141. Motor 141 drives the cam shaft of cam switch 142 until cam 158 reaches position 601 as indicated in FIG. 6, whereupon the switch is opened and the operation of motor 141 ceases. In this way cam switch 142 is returned to its home position, namely position 601.

The general concept of operation of the system is based upon the driving of the transmitter from whatever position at which it may be resting, through positions 316–330, inclusive, in order to insure that the receiver cam shaft will have sufficient time to return to its home position, namely position 401. The transmitter must always drive from whatever position it is in to its selected position while at the same time passing through positions 316–330, inclusive. For example, if the transmitter were to be moved from position 303 to position 311, the transmitter would still pass through positions 303–330 and then back to the selected position 311. Similarly, in going from position 311 to the selected position 310, it would be necessary for the transmitter to travel through positions 311–330, inclusive, and then from position 301 to position 310.

While the motor of the transmitter is operating, the system receiver stands by until cam switch 30 reaches position 316, at which point cam 30a operates relay 64 resulting in a low level D.C. voltage being applied to the system receiver to activate it. In the presence of the low level D.C. voltage, motor 107 which drives cam switch 93 of the receiver system operates until cam switch 106' reaches its home position, position 401, and then terminates the operation of the receiver motor. The receiver system then stands by until the transmitter has sufficient time to drive through positions 316–330, inclusive, and then back to its home position, position 301. Upon reaching position 301, cam 66' causes switch 66 to open with the result that the high level D.C. signal is applied to the receiver. This high level D.C. voltage is sufficient to operate relay 100 and energize motor 107 to drive cam switch 93 along with cam switch 30 of the transmitter to the selected position.

Thus it is seen that each time a new program is selected for the receiver, the receiver will first return to its initial position and then will go to the newly selected position. Consequently, if there had been any malfunctioning of the connecting circuit or a failure of any type, the effect would not be cumulative since each new command to the receiver will result in starting it from a predetermined controlled home position.

If the A.C. power furnished to the system should fail during operation and subsequently be restored, the system transmitter will go through one complete cycle to insure that all of the receivers are aligned with it. Upon an interruption in the A.C. power furnished to the system at terminal 159, relay 160 is no longer energized so that contact 160a no longer shunts switch 48. At the same time contact 160b is connected through line 161 to motor 31 which drives cam switch 30. Motor 31 drives cam switch 30 to position 316 where cam 48' closes switch 48 which reconnects transformer 50 to the A.C. supply so that the low voltage A.C. at terminal 52 is once again furnished to the transmitter. The energizing of terminal 52 serves to pull in relay 160 and thereby returns the system to normal operation.

Provision is made for an emergency call or fire lane provision by means of circuit 162. This circuit enables the normal program of the traffic controller to be overridden in order to permit the passage of an emergency vehicle directly through the area in which the traffic equipment is controlled by the subject device. When fire lane circuit 162 is to be activated, relay 62 is energized to operate contact 62a and disconnect ground terminal 61 from the transmitter so that the transmitter is inoperative. Fire lane circuit 162 operates for a predetermined length of time and then relay 62 drops out to restore the system to its normal operating condition.

System transmitter 11 may be connected to system receiver 89 by means of a connectional pair of wires connected between terminals 86, 87 and 86′, 87′, respectively. In place of the wire conductors, a radio channel may serve as the required single connecting circuit between the transmitter and receiver. Various other forms of single electrical connecting circuits may be used.

System transmitter 11 transmits signals to system receiver 89 which are either A.C., high level D.C., or low level D.C. In place of merely employing A.C. or D.C. signals of various levels, system transmitter 11 may select a plurality of tone signals to transmit information from the transmitter to the receiver. Similarly other coded signal techniques which are capable of providing signals clearly identifiable from one another may be employed by transmitter 11.

*Operation*

When employed in a traffic control system, the system transmitter of the invention may serve as a master traffic controller while the receiver of the invention may serve as a secondary traffic controller. A single transmitter may send information and thereby control a plurality of receivers by connecting the plurality of receivers in parallel with the single output circuit leading from the transmitter.

In operation, either program timer 21 or selector switches 12–14 inclusive, may be employed to select the offset and dial unit program to be transmitted to the receiver. The relays operated by either the program selector or selector switches, in turn, form circuits with various other switches of cam switch 30, depending upon the particular offset anad dial unit selected. The energizing of cam switches 32–37, inclusive, causes the actuation of relay 63 which starts motor 31 to drive cam switch 30. As the motor operates, cam switch 48 closes and subsequently cam switch 65 closes, as indicated in the chart of FIG. 3. The closure of cam switch 65 energizes relay 64 and subsequently relay 68. The operation of relay 68 results in the actuation of relays 70 and 72 which cause a low level D.C. signal to be applied to output terminals 86 and 87 leading to receiver 89.

At receiver 89 the low level D.C. signal passes through diode 98, but is reduced by the high impedance of resistor 99 so that it actuates relay 101 and thereby initiates the operation of motor 107 which drives receiver cam switch 93. As long as relay 101 remains energized in response to switch 65 of the transmitter and switch 106 of the receiver, motor 107 drives cam switch 93 until it arrives at position 401 shown in FIG. 5 at which point switch 106 opens, thereby terminating the operation of the motor. When switch 66 of the transmitter opens at position 301, relay 70 is de-energized, thereby causing the high level D.C. signal to be applied to terminals 86 and 87 leading to the system receiver. The high level D.C. signal passes through diode 98 and blocking resistor 99 to actuate relay 100. The actuation of relay 100 causes motor 107 to drive cam switch 93. The receiver continues to drive in synchronism with the transmitter until the selected offset and dial positions of the transmitter, as shown in the chart of FIG. 3, are reached. At this point relay 63 is de-energized, thereby terminating the drive of motor 31, and opening relay 68. The dropping out of relay 68 removes the high level D.C. output signal to the receiver causing relay 100 to drop out and terminate the drive of motor 107 to cam switch 93. At this point the selected contacts of cam switch 93 are connected with the devices to be controlled by the remote control system which may be the dial units and the offset units of the secondary traffic controllers.

In addition to employing the program timer or selector switches to set up an offset and dial unit program for the transmitter to transmit to the receiver, auxiliary transmitter 115 may be used to transmit a program to auxiliary receiver 114. The action of the auxiliary transmitter is similar to that of the system transmitter. The auxiliary transmitter transmits a control signal having a different polarity than that employed by the system transmitter. The signal of different polarity is transmitted to the auxiliary receiver where it is connected to the auxiliary receiver by diode 137. The signal passes through diode 137 to relay 140 to actuate motor 141 driving cam switch 142. The high level D.C. signal of reversed polarity passes through diode 137 and resistor 138 to actuate relay 139. From this point on the auxiliary receiver operates in a manner analogous to that of the system receiver to control cam switch 142 in response to the selected program for cam switch 115 of the system transmitter.

While one embodiment and a modification thereof have been described and illustrated, it will be apparent to those skilled in the art that other embodiments, as well as other modifications of the disclosed embodiment, may be made without departing from the spirit or scope of the invention except as defined in the appended claims.

What is claimed is:

1. In a remote control system, the combination including transmitter means and receiver means connected to said transmitter means by a single circuit, said transmitter means having means for providing a plurality of control signals each identifiable from the other, low voltage means for sending a first control signal to said receiver means by way of said single circuit, and high voltage means for sending a second control signal to said receiving means by way of said single circuit for a predetermined interval after said first control signal; and said receiver means having means for activating devices to be controlled by said remote control system, means for synchronizing said activating means to said transmitter means in response to said first control signal, means responsive to said predetermined interval of said second control signal to actuate said activating means, whereby a control program is transferred from said transmitted means to said receiver means.

2. In a remote control system, the combination including transmitter means and receiver means connected to said transmitter means by a single circuit, said transmitter means having means for providing a plurality of control signals each identifiable from the other, low voltage means for sending a first control signal to said receiver means by way of said single circuit, high voltage means for sending a second control signal to said receiver means by way of said signal circuit for a predetermined interval after said first control signal, and means for selecting the duration of said predetermined interval; and said receiver means having means for activating devices to be controlled by said remote control system means for synchronizing said activating means to said transmitter means in response to said first control signal, means for actuating said activating means in response to said second signal, whereby a control program is transferred from said transmitter means to said receiver means.

3. In a remote control system, the combination including a transmitter having output means, means for providing a plurality of control signals each identifiable from the other, a plurality of transmitter switch means, said plurality of transmitter switch means in an activated condition connecting said control signals to said transmitter output means, means for operating said plurality of transmitter switch means to said activated condition within the operating cycle of said transmitter, each of said transmitter switch means corresponding to a device to be controlled by said remote control system; and a receiver having input means for connecting said receiver to a single circuit connected to said transmitter output means, a plurality of receiver switch means, said plurality of receiver switch means in an activated condition energizing devices to be controlled by said remote control system, means for operating said plurality of receiver switch means to said activated condition within the operating cycle of said receiver, and means responsive to said transmitted control signals for actuating said operating means to operate said plurality of receiver switch means through a reference location to a location within said receiver operating cycle wherein said device corresponding to said transmitter switch means is energized by said activated receiver switch means.

4. In a remote control system, the combination including a transmitter having outut means, means for providing a plurality of control signals each identifiable from the other, a plurality of transmitter switch means, said plurality of transmitter switch means in an activated condition connecting said control signals to said transmitter output means, means for operating said plurality of transmitter switch means to said activated condition within the operating cycle of said transmitter, and means for selecting transmitter switch means of said plurality to be activated at predetermined locations in said operating cycle, each of said selected transmitter switch means corresponding to a device to be controlled by said remote control system; and a receiver having input means for connecting said receiver to a single circuit connected to said transmitter output means, a plurality of receiver switch means, said plurality of receiver switch means in or activated condition energizing devices to be controlled by said remote control system, means for operating said plurality of receiver switch means to said activated conditions within the operating cycle of said receiver, and means responsive to said transmitted control signals for actuating said operating means to operate said plurality of receiver switch means through a reference location to a location within said receiver operating cycle wherein said devices corresponding to said selected transmitter switch means is energized by said activated receiver switch means.

5. In a remote control system, the combination including transmitter and receiver means connected to said transmitter means by a single circuit, said transmitter means having a plurality of transmitter switch means, means for actuating said transmitter switch means in a predetermined sequence, means for selectively energizing said transmitter switch means to form a control program, said actuating means actuating an energized transmitter switch means to provide a first control signal to said receiver means, said actuating means actuating another energized transmitter switch means for a predetermined interval after said first control signal to provide a second control signal to said receiver means; and said receiver means having a plurality of receiver switch means in substantial accordance with said transmitter switch means, means for actuating said receiver switch means in a predetermined sequence, the predetermined sequence of said receiver switch means and said transmitter switch means being in substantial accordance, means for activating said receiver switch actuating means for synchronizing said receiver switch means to said transmitter switch means in response to said first control signal, additional means for activating said receiver switch actuating means, said additional activating means being responsive to said predetermined interval of said second control signal to activate said receiver switch actuating means to actuate said receiver switch means to a location in the predetermined sequence of said receiver switch means corresponding to the energized transmitter switch means, whereby said control program is transferred from said transmitter means to said receiver means.

6. In a remote control system, the combination including transmitter and receiver means connected to said transmitter means by a single circuit, said transmitter means having a plurality of transmitter switch means in a predetermined sequence, means for selectively energizing said transmitter switch means to form a control program, means for providing a plurality of control signals each identifiable from the other, said actuating means actuating an energized transmitter switch means to provide a first control signal from said control signal means to said receiver means, said actuating means actuating another energized transmitter switch means for a predetermined interval after said first control signal to provide a second control signal from said control signal means to said receiver means; and said receiver means having a plurality of receiver switch means in substantial accordance with said transmitter switch means, means for actuating said receiver switch means in a predetermined sequence, the predetermined sequences of said receiver switch means and said transmitter switch means being in substantial accordance, means for activating said receiver switch actuating means for synchronizing said receiver switch means to said transmitter switch means only in response to said first control signal, additional means for activating said receiver switch actuating means, said additional activating means being responsive to said predetermined interval of only said second control signal to activate said receiver switch actuating means to actuate said receiver switch means to a location in the predetermined sequence of said receiver switch means corresponding to the energized transmitter switch means, whereby said control program is transferred from said transmitter means to said receiver means.

References Cited by the Examiner

UNITED STATES PATENTS

| | | | |
|---|---|---|---|
| 1,620,987 | 3/1927 | Trenor | 340—167 |
| 1,949,590 | 3/1934 | Trogner | 340—167 |
| 2,222,218 | 11/1940 | Wallace | 340—167 |
| 2,287,786 | 6/1942 | Diamond | 340—147 |
| 2,398,594 | 4/1946 | Muehter | 340—287 |
| 2,424,243 | 7/1947 | Lowell | 340—147 |
| 2,826,752 | 3/1958 | Hendricks et al. | 340—357 X |
| 2,832,060 | 4/1958 | Hendricks et al. | 340—40 X |
| 2,883,647 | 4/1959 | Leeds et al. | 340—167 X |
| 2,921,291 | 1/1960 | Hembrooke | 340—167 |

NEIL C. READ, *Primary Examiner.*